Patented Jan. 21, 1941

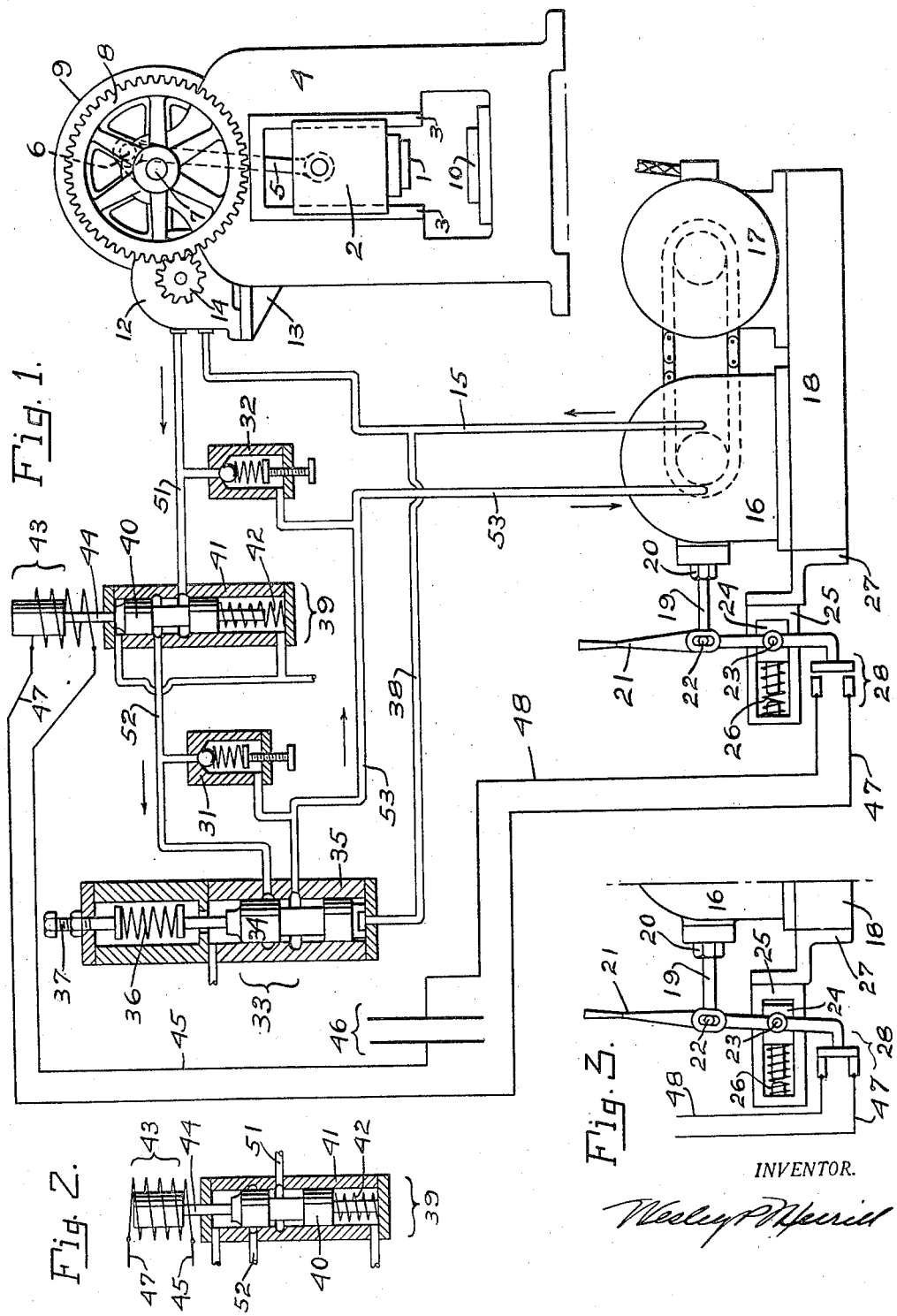

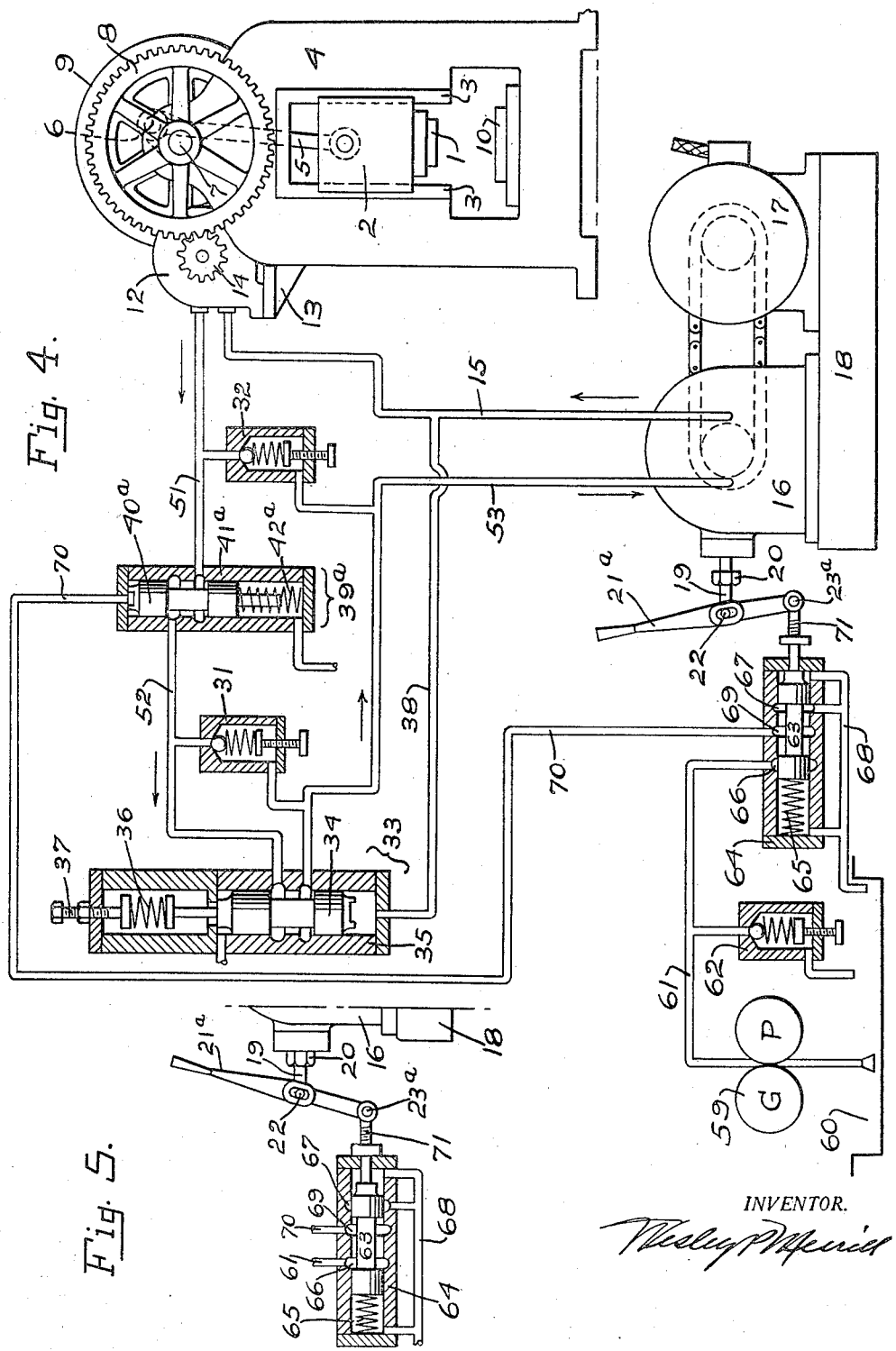

2,229,419

UNITED STATES PATENT OFFICE 2,229,419

HYDRAULIC TRANSMISSION

Wesley P. Merrill, Milwaukee, Wis., assignor to The Oilgear Company, Milwaukee, Wis., a corporation of Wisconsin Application December 17, 1938, Serial No. 246,275

6 Claims. (Cl. 60—53)

This invention relates to a hydraulic transmission of the type which includes a rotary hydraulic motor and a variable displacement pump.

A transmission of this type is sometimes employed to drive a shaft or the like which tends to overrun and drive the motor under certain conditions of operation or during a part of a revolution. For example, the crank of a crankshaft or the cam of a camshaft may oppose rotation of the shaft until the crank or cam passes dead center in respect to the load and then the load will react upon the crank or cam and tend to drive the shaft, thereby causing the shaft to tend to drive the prime mover that drives it and to take up all the backlash in the gearing between the driving motor and the shaft.

The above mentioned objectionable characteristics have heretofore been overcome by connecting a resistance valve and a by-pass valve into the return side of the circuit and so arranging and controlling the by-pass valve that the motor must discharge through the resistance valve until pump displacement exceeds a predetermined value and then the by-pass valve is shifted to permit the liquid discharged by the pump to flow freely therethrough to the pump, as disclosed in application Serial No. 137,738, filed April 19, 1937, by Walter Ferris, issued June 25, 1940, as Patent No. 2,205,647.

In the apparatus disclosed in the above application, the by-pass valve is shifted magnetically in response to pump displacement being increased beyond a predetermined value.

The present invention has as an object to provide a transmission of the above character with a by-pass valve which is operated automatically so that the motor discharge is unrestricted unless the load tends to overrun and drive the motor and then the by-pass valve operates to direct the motor discharge through the resistance valve regardless of pump displacement or motor speed.

Another object is to enable the operator to reduce pump displacement to zero and to apply a brake load upon the motor by operating a single control element.

Other objects and advantages will appear from the following description of the hydraulic transmissions shown schematically in the accompanying drawings in which the views are as follows:

Fig. 1 is a diagrammatic view showing the invention incorporated in a hydraulic transmission which is employed to drive a blanking press, the several parts being shown in the positions occupied when the press is idle.

Fig. 2 is a view showing a blocking valve shifted to a position other than that shown in Fig. 1.

Fig. 3 is a view showing the pump control lever shifted to a position to cause the blocking valve to be shifted from the position shown in Fig. 1 to the position shown in Fig. 2.

Fig. 4 is a view similar to Fig. 1 but showing the transmission provided with means for operating the blocking valve hydraulically.

Fig. 5 is a view showing the control valve shifted to a position different than that shown in Fig. 4.

For the purpose of illustration, the invention has been shown as being employed to drive a blanking press but it is to be understood that it may as readily be employed to drive any rotating member which has a tendency to overrun during a given part of each revolution or under certain conditions of operation, such for example as the camshaft of a knitting machine in which rollers are urged by springs against the cams on the shaft.

FIGS. 1 TO 3

The press chosen for illustration is adapted to have an upper die 1 fixed to a platen 2 which is fitted for vertical reciprocation between guides or ways 3 carried by the frame 4 of the press. Platen 2 is connected by a link 5 to the crank pin 6 of a crankshaft 7 which is journaled in the upper end of frame 4 and has fixed thereon a gear wheel 8 and a flywheel 9. Shaft 7 when rotated will cause platen 2 to be reciprocated vertically along guides 3 and move die 1 toward and from a lower die 10 which is carried by frame 4.

Power for driving the press is transmitted thereto through a hydraulic motor 12 which has been shown arranged upon a bracket 13 carried by frame 4. Motor 12 is provided with a driving pinion 14 which meshes with gear wheel 8 so that, when motor 12 is energized, it will rotate gear wheel 8 and crankshaft 7 and thereby reciprocate platen 2.

The die carried by the platen of a press of this type is often so large and heavy that, as soon as the crank pin passes upper dead center, the combined weight of the platen and the upper die is great enough to cause the crankshaft to overrun and tend to drive the prime mover that drives it.

This tendency of the crankshaft to overrun does no harm during normal operation of the press and is overcome by the inertia of flywheel 9 when the press is performing useful work. However, before the dies are finally adjusted, it is essential that the upper die be lowered until it is just clear of the lower die, then the dies be carefully adjusted, and then the upper die be slowly lowered into the lower die for the reason that a pair of blanking dies have a very close fit one with the other and, if the upper die strikes the lower die, one or both of the dies are ruined or at least damaged. In order to prevent crankshaft 7 from overrunning, motor 12 is caused to discharge through a resistance valve whenever shaft 7 tends to overrun as will presently appear.

Motor 12 is driven by liquid supplied thereto through a pressure channel 15 by a variable displacement pump 16 which has been shown as being driven by an electric motor 17 and arranged therewith upon a reservoir 18 from which pump 16 is supplied with liquid through a channel not shown.

A pump which may be employed for this purpose is shown in Patent No. 2,033,464. This pump is provided, as is customary, with a relief valve which will open when pump pressure becomes excessive. Pump displacement is varied by a hydraulic servo-motor which is operated by liquid supplied thereto by an auxiliary pump under the control of a follow-up valve so that a variation in pump displacement is always proportional to the distance through which the valve is moved. The valve is shifted by means of a stem which extends outward through the pump casing and has been designated in Fig. 1 by reference numeral 19.

Since pump 16 needs to deliver liquid in but one direction, a stop 20 is arranged upon stem 19 and so adjusted that it will abut the end of the valve casing when pump displacement is zero.

For the purpose of illustration, valve stem 19 has been shown as being connected at its outer end to a control lever 21 by a pivot 22. Lever 21 is pivoted upon a pin 23 carried by a slide 24 which is fitted in a normally stationary guide 25 and urged against the right end thereof by a spring 26. Guide 25 is fixed in a stationary position as by being fastened to a bracket 27 attached to reservoir 18. The lower end of lever 20 extends below slide 24 and carries the movable contact of an electric switch 28.

The arrangement is such that, when the upper end of lever 21 is moved toward the left, lever 21 will pivot upon pin 23 and move valve stem 19 toward the left, thereby causing pump 16 to deliver liquid through channel 15 to motor 12 at a rate proportional to the distance stem 19 is moved from the position shown in Fig. 1.

Thereafter, when the upper end of lever 21 is moved toward the right as from the position shown in Fig. 4, lever 21 will pivot upon pin 23 and move valve stem 19 toward the right to gradually reduce the displacement of pump 16 until stop 20 abuts the end of the valve casing at which time pump 16 has been adjusted to zero displacement and no liquid will be delivered thereby.

Since stop 20 prevents further movement of valve stem 19 toward the right, further movement of the upper end of lever 21 toward the right will cause lever 21 to swing upon pivot 22 and move pin 23 and slide block 24 toward the left against the resistance of spring 26 until switch 28 is closed as shown in Fig. 3, suitable stops being provided to limit the movement of slide 24 to thereby prevent switch 28 from being damaged.

The liquid discharged by pump 16 energizes motor 12 and causes it to drive the press. The liquid discharged by motor 12 is caused to flow either through a low pressure resistance valve 31, through a high pressure resistance valve 32 which functions as a brake valve, or through a by-pass valve 33 which has its valve member 34 fitted in a valve casing 35 and urged toward closed position by a spring 36 the tension of which may be adjusted by a screw 37. Valve member 34 is adapted to be moved to open position as shown in Fig. 4 by liquid supplied to the lower end of casing 35 through a channel 38 which is connected to pressure channel 15 intermediate the ends thereof.

In order that the liquid discharged by motor 12 may be forced through brake valve 32, there is provided a blocking valve 39 which has its valve member 40 fitted in a casing 41 and urged toward open position by spring 42. Valve member 40 is adapted to be moved to closed position as shown in Fig. 2 by a solenoid 43 which has its core connected by a stem 44 to valve member 40, one end of its winding connected by a conductor 45 to one side of a power line 46 and the other end of its winding connected by a conductor 47 to one stationary contact of switch 28 the other stationary contact of which is connected by conductor 48 to the other side of power line 46.

Motor 12 has its outlet connected by a channel 51 to blocking valve casing 41 at a point intermediate the ends thereof. By-pass valve casing 35 is connected at a point intermediate the ends thereof to one end of a channel 52 the other end of which is connected to blocking valve casing 41 at a point spaced from channel 51. Pump 16 has its intake connected by a return channel 53 to by-pass valve casing 35 at a point spaced from channel 52. Resistance valve 31 has its inlet connected to channel 52 and its outlet connected to return channel 53. Brake valve 32 has its inlet connected to channel 51 and its outlet connected to return channel 53.

*Operation*

When electric motor 17 is driving pump 16 and control lever 21 is in its neutral position as shown in Fig. 1, pump 16 will be at zero stroke and no liquid will be delivered thereby so that motor 12 will be idle, by-pass valve 33 will be held closed by its spring 36, and switch 28 will be open so that blocking valve 39 will be held open by its spring 42.

If the dies are to be adjusted, the upper end of control lever 21 is moved slightly toward the left. Pump 16 will then deliver liquid at a limited rate through channel 15 to motor 12 and cause it to rotate crankshaft 7 slowly, pressure will extend from channel 15 through channel 38 to the lower end of valve casing 35 and raise valve member 34 to open communication between channels 52 and 53, and the liquid discharged by motor 12 will flow freely through channel 51, blocking valve 39, channel 52, by-pass valve 33 and channel 53 to the intake of pump 16.

After crank pin 6 passes upper dead center, the combined weight of platen 2 and die 1 will exert a greater rotative force upon crankshaft 7 than is exerted thereon by motor 12, thereby tending to drive motor 12 at a rate greater than the rate it is being driven by pump 16 and causing the pressure in channels 15 and 38 to drop so that spring 36 can close by-pass valve 33. Then the liquid discharged by motor 12 will flow from channel 52 into channel 53 through resistance valve 31 which has sufficient resistance to prevent motor 12 from being driven by the combined weight of platen 2 and die 1.

Motor 12 will continue to rotate crankshaft 7 at a slow rate until die 1 is just clear of die 10 and then lever 21 is returned to its neutral position to reduce the displacement of pump 16 to zero and thereby stop the press so that the dies may be adjusted relative to each other.

After the dies have been properly adjusted, the upper end of lever 21 may be moved slightly toward the left to cause pump 16 to deliver liquid at a very limited rate and thereby cause die 1 to be lowered very slowly into die 10 to check the adjustment. Then the upper end of lever 21 may be swung farther toward the left to cause the press to operate at high speed.

The press may be stopped at any time or at the end of each cycle of operation by moving lever 21 to its neutral position, or it may be permitted to operate continuously by leaving lever 21 in its operative position.

During high speed operation of the press, the inertia of flywheel 9 ordinarily prevents the weight of platen 2 and die 1 from causing the pressure in channel 15 to drop sufficiently to permit by-pass valve 33 to close. However, if by-pass valve 33 should close due to the weight of platen 2 and die 1 tending to drive motor 12, no harm or delay would result as the resistance of valve 31 would cause the pressure in channel 15 to immediately rise and reopen by-pass valve 33.

If an emergency should arise, such as a work piece being improperly located upon die 10 or too many work pieces being fed simultaneously between the dies, the press may be stopped very quickly by swinging the upper end of control lever 21 toward the right to the limit of its movement.

Lever 21 would at first swing upon pin 23 until valve stem 19 reached the limit of its movement as determined by stop 20 and then it would swing upon pivot 22 and shift slide 24 till switch 28 was closed.

Shifting valve stem 19 to the limit of its movement toward the right would cause the displacement of pump 16 to be reduced to zero as previously explained. Closing switch 28 would cause solenoid 43 to be energized and to close blocking valve 39 so that all liquid discharged by motor 12 would be forced to pass through brake valve 32 which has sufficient resistance to very quickly decelerate the press to a complete stop.

FIGS. 4 AND 5

The apparatus shown in Fig. 4 is the same as the apparatus shown in Fig. 1 except that the blocking valve is operated hydraulically instead of mechanically. Consequently, like parts have been indicated by like reference numerals and only a brief description is deemed necessary.

Communication between channels 51 and 52 is controlled by a blocking valve 39ᵃ the valve member 40ᵃ of which is fitted in a casing 41ᵃ and urged upward or toward open position by a spring 42ᵃ.

Valve member 40ᵃ is adapted to be moved downward or to closed position by liquid delivered to the upper end of casing 41ᵃ from a gear pump 59 which draws liquid from a reservoir 60 and discharges continuously through a channel 61 and a relief valve 62 into reservoir 60.

For the purpose of illustration, gear pump 59 and relief valve 62 have been shown separate from pump 16 but in practice both are arranged inside the casing of pump 16, and gear pump 59 is driven in unison with pump 16 according to the usual practice and as shown in Patent No. 2,033,464 referred to above.

Delivery of liquid to the upper end of blocking valve casing 41ᵃ is under the control of a pilot valve 63 which is fitted in a stationary valve casing 64 and urged against the right end thereof by a spring 65.

Valve casing 64 has formed therein a port 66 which is connected to gear pump discharge channel 61 and normally blocked by valve 63, a port 67 which is connected to a drain channel 68, and a port 69 which is arranged between ports 66 and 67 and connected by a channel 70 to the upper end of blocking valve casing 41ᵃ.

Valve 63 has a stem 71 connected by a pin 23ᵃ to the lower end of a control lever 21ᵃ which is connected by pivot 22 to the control valve stem 19 of pump 16.

Spring 65 normally holds valve 63 against the right end of valve casing 64 so that pin 23ᵃ remains stationary and lever 21ᵃ may pivot thereon to vary pump displacement in the previously described manner.

During normal operation of the press, port 66 is blocked by valve 63 and port 69 is open to port 67 so that the pressure in the upper end of valve casing 41ᵃ is zero and spring 42ᵃ is thus able to hold blocking valve 39ᵃ open.

The apparatus functions exactly the same as the apparatus shown in Fig. 1 functions. If an emergency should arise, the operator would swing the upper end of lever 21ᵃ toward the right. Lever 21ᵃ would pivot upon pin 23ᵃ until valve stem 19 reached the limit prescribed by stop 20 and then lever 21ᵃ would turn upon pivot 22 and shift valve 63 toward the left to the position shown in Fig. 5, thereby closing port 67 and opening port 66 to port 69 so that liquid from gear pump 59 could flow through channel 70 to the upper end of valve casing 41ᵃ and move valve member 40ᵃ downward to close communication between channels 51 and 52 as shown in Fig. 2. The liquid discharged by motor 12 must then pass through brake valve 32 as previously explained.

The invention herein set forth is susceptible of various modifications and adaptations without departing from the scope thereof as hereafter claimed.

The invention is hereby claimed as follows:

1. The combination, with a shaft having a tendency to overrun during at least a part of a revolution, of a hydraulic motor connected to said shaft to drive the same, a power driven pump for supplying motive liquid to said motor to energize the same, fluid channels connecting said pump and said motor and forming therewith a hydraulic circuit having pressure and return sides, a low pressure resistance valve connected into one part of the return side of said circuit to resist the discharge of liquid from said motor and thereby prevent said shaft from overrunning, a high pressure resistance valve connected in parallel with said valve to provide a high resistance to the discharge of liquid from said motor and thereby function as a brake to stop said motor and said shaft, a by-pass valve connected into another part of said return side and adapted when open to by-pass around said resistance valves the liquid discharged by said motor, means responsive to the pressure of the liquid in the pressure side of said circuit exceeding a predetermined value for opening said by-pass valve, and other means separately operable for causing all of the liquid discharged by said motor to pass through said high pressure resistance valve.

2. The combination, with a shaft having a tendency to overrun during at least a part of a revolution, of a hydraulic motor connected to said shaft to drive the same, a power driven pump for supplying motive liquid to said motor to energize the same, fluid channels connecting said pump and said motor and forming therewith a hydraulic circuit having pressure and return sides, a low pressure resistance valve connected into one part of the return side of said circuit to resist the discharge of liquid from said motor and thereby prevent said shaft from overrunning, a high pressure resistance valve connected in parallel with said valve to provide a high resistance to the discharge of liquid from said motor and thereby function as a brake to stop said motor and said shaft, a by-pass valve connected into another part of said return side and adapted when open to by-pass around said resistance valves the liquid discharged by said motor, means responsive to the pressure of the liquid in the pressure side of said circuit exceeding a predetermined value for opening said by-pass valve, a normally open fourth valve connected into the return side of said circuit and adapted when closed to cause all of the liquid discharged by said motor to pass through said high pressure resistance valve, and means for closing said fourth valve.

3. The combination, with a shaft having a tendency to overrun during at least a part of a revolution, of a hydraulic motor connected to said shaft to drive the same, a power driven pump for supplying motive liquid to said motor to energize the same, fluid channels connecting said pump and said motor and forming therewith a hydraulic circuit having pressure and return sides, a low pressure resistance valve connected into one part of the return side of said circuit to resist the discharge of liquid from said motor and thereby prevent said shaft from overrunning, a high pressure resistance valve connected in parallel with said valve to provide a high resistance to the discharge of liquid from said motor and thereby function as a brake to stop said motor and said shaft, a by-pass valve connected into another part of said return side and adapted when open to by-pass around said resistance valves the liquid discharged by said motor, means responsive to the pressure of the liquid in the pressure side of said circuit exceeding a predetermined value for opening said by-pass valve, means for varying the displacement of said pump to thereby vary the speed of said motor, and means responsive to a part of said displacement varying means being moved to a given point for causing all of the liquid discharged by said motor to pass through said high pressure resistance valve.

4. The combination, with a shaft having a tendency to overrun during at least a part of a revolution, of a hydraulic motor connected to said shaft to drive the same, a power driven pump for supplying motive liquid to said motor to energize the same, fluid channels connecting said pump and said motor and forming therewith a hydraulic circuit having pressure and return sides, a low pressure resistance valve connected into one part of the return side of said circuit to resist the discharge of liquid from said motor and thereby prevent said shaft from overrunning, a high pressure resistance valve connected in parallel with said valve to provide a high resistance to the discharge of liquid from said motor and thereby function as a brake to stop said motor and said shaft, a by-pass valve connected into another part of said return side and adapted when open to by-pass around said resistance valves the liquid discharged by said motor, means responsive to the pressure of the liquid in the pressure side of said circuit exceeding a predetermined value for opening said by-pass valve, means for varying the displacement of said pump to thereby vary the speed of said motor, a normally open fourth valve connected into the return side of said circuit and adapted when closed to cause all of the liquid discharged by said motor to pass through said high pressure resistance valve, and means responsive to a part of said displacement varying means being moved to a given point for closing said fourth valve.

5. The combination, with a shaft having a tendency to overrun during at least a part of a revolution, of a hydraulic motor connected to said shaft to drive the same, a power driven pump for supplying motive liquid to said motor to energize the same, fluid channels connecting said pump and said motor and forming therewith a hydraulic circuit having pressure and return sides, a low pressure resistance valve connected into one part of the return side of said circuit to resist the discharge of liquid from said motor and thereby prevent said shaft from overrunning, a high pressure resistance valve connected in parallel with said valve to provide a high resistance to the discharge of liquid from said motor and thereby function as a brake to stop said motor and said shaft, a by-pass valve connected into another part of said return side and adapted when open to by-pass around said resistance valves the liquid discharged by said motor, means responsive to the pressure of the liquid in the pressure side of said circuit exceeding a predetermined value for opening said by-pass valve, means for varying the displacement of said pump to thereby vary the speed of said motor, a normally open fourth valve connected into the return side of said circuit and adapted when closed to cause all of the liquid discharged by said motor to pass through said high pressure resistance valve, a solenoid for closing said fourth valve, a switch for energizing said solenoid, and means responsive to a part of said displacement varying means being moved to a given point for closing said switch.

6. The combination, with a shaft having a tendency to overrun during at least a part of a revolution, of a hydraulic motor connected to said shaft to drive the same, a power driven pump for supplying motive liquid to said motor to energize the same, fluid channels connecting said pump and said motor and forming therewith a hydraulic circuit having pressure and return sides, a low pressure resistance valve connected into one part of the return side of said circuit to resist the discharge of liquid from said motor and thereby prevent said shaft from overrunning, a high pressure resistance valve connected in parallel with said valve to provide a high resistance to the discharge of liquid from said motor and thereby function as a brake to stop said motor and said shaft, a by-pass valve connected into another part of said return side and adapted when open to by-pass around said resistance valves the liquid discharged by said motor, means responsive to the pressure of the liquid in the pressure side of said circuit exceeding a predetermined value for opening said by-pass valve, means for varying the displacement of said pump to thereby vary the speed of said motor, a normally open fourth valve connected into the return side of said circuit and adapted when closed to cause all of the liquid discharged by said motor to pass through said high pressure resistance valve, hydraulic means for closing said fourth valve, and means responsive to a part of said displacement varying means being moved to a given point for energizing said hydraulic means.

WESLEY P. MERRILL.